United States Patent
Jinnai et al.

(10) Patent No.: US 9,835,165 B2
(45) Date of Patent: Dec. 5, 2017

(54) TURBINE HOUSING ASSEMBLY AND MANUFACTURING METHOD OF TURBINE HOUSING ASSEMBLY

(71) Applicant: MITSUBISHI HEAVY INDUSTRIES, LTD., Tokyo (JP)

(72) Inventors: Yasuaki Jinnai, Tokyo (JP); Hiroyuki Arimizu, Tokyo (JP); Koen Kramer, Almere (NL)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 481 days.

(21) Appl. No.: 14/387,104

(22) PCT Filed: Mar. 22, 2013

(86) PCT No.: PCT/JP2013/058389
§ 371 (c)(1),
(2) Date: Sep. 22, 2014

(87) PCT Pub. No.: WO2013/141379
PCT Pub. Date: Sep. 26, 2013

(65) Prior Publication Data
US 2015/0086347 A1    Mar. 26, 2015

(30) Foreign Application Priority Data

Mar. 23, 2012 (JP) ................. 2012-068209

(51) Int. Cl.
*F04D 29/40* (2006.01)
*F01D 9/02* (2006.01)
(Continued)

(52) U.S. Cl.
CPC ............ *F04D 29/403* (2013.01); *B23P 19/04* (2013.01); *F01D 9/026* (2013.01); *F04D 17/10* (2013.01);
(Continued)

(58) Field of Classification Search
CPC ................. F04D 29/403; F01D 9/026
(Continued)

(56) References Cited

U.S. PATENT DOCUMENTS

| 4,850,797 A | 7/1989 | Benson |
| 6,553,762 B2 | 4/2003 | Loffler et al. |

(Continued)

FOREIGN PATENT DOCUMENTS

| CN | 1508435 A | 7/2011 |
| CN | 102127674 A | 7/2011 |

(Continued)

OTHER PUBLICATIONS

Extended European Search Report effective dated Mar. 14, 2016 issued in corresponding EP Application No. 13764441.5.
(Continued)

*Primary Examiner* — Criag Kim
*Assistant Examiner* — Jason Fountain
(74) *Attorney, Agent, or Firm* — Birch, Stewart, Kolasch & Birch, LLP

(57) ABSTRACT

A turbine housing assembly includes a plurality of constituent members connected to one another and easily manufactured. The turbine housing assembly includes a scroll part, an annular lid part, an exhaust gas outlet and a connection part connectable to a bearing housing for a turbine shaft. The scroll part and the connection part are each formed of a single piece of sheet metal and each is welded to the annular lid part that is orthogonal to a turbine axial direction so that the scroll part and the connection part are connected to each other via the annular lid part. Such a turbine housing assembly is of reduced weight, is quite easy to manufacture, of reduced cost, and can be made, at least in part, of materials having lower heat capacity as compared to conventional turbine housings made of sheet metal.

9 Claims, 9 Drawing Sheets

(51) Int. Cl.
*B23P 19/04* (2006.01)
*F04D 17/10* (2006.01)

(52) U.S. Cl.
CPC .... *F05D 2220/40* (2013.01); *F05D 2230/232* (2013.01); *F05D 2230/54* (2013.01); *Y10T 29/49321* (2015.01)

(58) Field of Classification Search
USPC .......................................................... 415/204
See application file for complete search history.

(56) References Cited

U.S. PATENT DOCUMENTS

| | | |
|---|---|---|
| 7,198,459 B2 | 4/2007 | Grussmann et al. |
| 7,371,047 B2 | 5/2008 | Burmester et al. |
| 2006/0133931 A1 | 6/2006 | Burmester et al. |
| 2011/0280717 A1 | 11/2011 | Wada et al. |

FOREIGN PATENT DOCUMENTS

| | | | |
|---|---|---|---|
| CN | 102203396 A | 9/2011 | |
| DE | 102004039477 A1 * | 2/2006 | ............ F01D 9/026 |
| EP | 1 357 278 A2 | 10/2003 | |
| JP | 61-132800 A | 6/1986 | |
| JP | 2006-527322 A | 11/2006 | |
| JP | 2007-224827 A | 9/2007 | |
| JP | 2008-57448 A | 3/2008 | |
| JP | 2011-174460 A | 9/2011 | |

OTHER PUBLICATIONS

International Preliminary Report on Patentability and Written Opinion of the International Searching Authority, (forms PCT/IB/338, PCT/IB/326, PCT/IB/373 and PCT/ISA/237), dated Oct. 2, 2014, for International Application No. PCT/JP2013/058389, along with an English translation of Written Opinion.
International Preliminary Report on Patentability and Written Opinion of the International Searching Authority, (forms PCT/IB/338, PCT/IB/326, PCT/IB/373 and PCT/ISA/237), dated Oct. 2, 2014, for International Application No. PCT/JP2013/058396, along with an English translation of Written Opinion.
International Search Report and Written Opinion of the International Searching Authority (forms PCT/ISA/210, PCT/ISA/220 and PCT/ISA/237), dated May 28, 2013, for International Application No. PCT/JP2013/058389, along with an English translation of the International Search Report.
International Search Report and Written Opinion of the International Searching Authority (forms PCT/ISA/210, PCT/ISA/220 and PCT/ISA/237), dated May 28, 2013, for International Application No. PCT/JP2013/058396.
Chinese Office Action effective dated May 25, 2016 issued to the relating Chinese Application No. 201380015195.0 with an English Translation.
U.S. Office Action dated Oct. 20, 2016 in related U.S. Appl. No. 14/386,425.
Decision to Grant a Patent Effective Jul. 14, 2016 issued in related Japanese Application No. 2012-068210 with an English Translation.
Decision to Grant a Patent Effective Jul. 5, 2016 issued in related Japanese Application No. 2012-068209 with an English Translation.
Extended European Search Report effective dated May 24, 2016 issued in related EP Application No. 13764393.8.
Office Action effective dated Apr. 19, 2016 issued in related Japanese Application No. 2012-068210 with an English Translation.
Chinese Office Action effective dated Apr. 1, 2016 issued in the corresponding Chinese Application No. 201380015197 with an English Translation.
Notice of Allowance effective dated Dec. 27, 2016 issued to the corresponding CN Application No. 201380015197.X with an English Translation.

* cited by examiner

TURBINE HOUSING ASSEMBLY AND MANUFACTURING METHOD OF TURBINE HOUSING ASSEMBLY

TECHNICAL FIELD

The present invention relates to a turbine housing assembly which includes a plurality of constituent members connected to one another to constitute a turbine housing into which a turbine wheel rotated by exhaust gas introduced from an engine may be inserted, and a manufacturing method of the turbine housing assembly.

BACKGROUND

Conventionally, there has been known a turbocharger in which a turbine wheel is rotated by utilizing energy of exhaust gas introduced from an engine to rotate a compressor wheel disposed coaxially with the turbine wheel, so that pressurized air is supplied to an air-intake manifold, thereby improving output of the engine. In recent years, in the case where such a turbocharger is to be mounted on a vehicle, there is need for reduction of weight, cost-cutting, facilitation of manufacture, reduction of heat capacity, or the like. Thus, a turbine housing made of sheet metal has been increasingly used in the place of a conventional turbine housing made by casting.

As an example of a turbine housing made of sheet metal, Patent Document 1 discloses a turbine housing which includes a scroll part formed by bringing two right-and-left sheet metal members each having a plate-like shape or a bowl-like shape in contact with each other, and welding them in the circumferential direction, the scroll part having an exhaust gas flow path of a spiral shape formed inside. In addition, Patent Document 2 discloses a turbine housing including a housing of a scroll-like shape made of sheet metal and having an exhaust gas flow path of a spiral shape formed therein and an outer shell made of sheet metal, the outer shell being configured to cover the housing of a scroll-like shape.

CITATION LIST

Patent Literature

Patent Document 1: JP2008-57448
Patent Document 2: JP4269184B

SUMMARY

Technical Problem

However, for the above described turbine housing of Patent Document 1, the manufacture of the scroll part requires troublesome steps because the scroll part is formed by preparing two right-and-left sheet metal members each having a complex shape processed into a plate-like shape or a bowl-like shape, bringing the two members into contact with each other, and welding them in the circumferential direction. Further, although Patent Document 1 discloses that the scroll part made of sheet metal is directly connected to a bearing housing made by casting (FIG. 3), there is no disclosure regarding details of the connecting part.

Furthermore, the above described turbine housing of Patent Document 2 includes a housing, a bearing ring or the like fitted with one another, which negatively affects sealability of the housing with respect to exhaust gas. Thus, for the turbine housing of Patent Document 2, it is necessary to provide an outer shell for covering the housing of a scroll-like shape, which raises a problem in that it is difficult to reduce the weight and heat capacity of the turbine housing sufficiently.

The present invention was made in view of the above described problem of the prior art. An object is to provide a turbine housing assembly in which reduction of weight, facilitation of manufacture, cost-cutting, reduction of heat capacity are further promoted compared to a conventional turbine housing made of sheet metal, and a manufacturing method of the turbine housing assembly.

Solution to Problem

The present invention was made to achieve the above described object. A turbine housing assembly of the present invention includes a plurality of constituent members connected to one another to constitute a turbine housing into which a turbine wheel rotated by exhaust gas introduced from an engine is inserted. The turbine housing assembly at least includes: a scroll part of a bottomed cylindrical shape that has a surrounding wall part and a bottom face part, the scroll part including: an exhaust gas flow path of a spiral shape formed inside the bottomed cylindrical shape and configured such that exhaust gas that has flowed in from an exhaust gas inlet flows through the exhaust gas flow path; and an exhaust gas outlet having a through hole formed on the bottom face part, the exhaust gas outlet being configured such that the exhaust gas that has flowed through the exhaust gas flow path flows out from the exhaust gas outlet; and a connection part connectable to a bearing housing that houses a bearing for supporting a rotation shaft of the turbine wheel, the scroll part and the connection part each being formed by processing a single piece of sheet metal and each being welded to an annular lid part that is orthogonal to a turbine axial direction, so that the scroll part and the connection part are connected to each other in the turbine axial direction via the annular lid part.

For the turbine housing assembly of the above configuration, a turbine housing is broken down into modules such as the scroll part inside which the exhaust gas flow path of a spiral shape is formed and the connection part configured connectable to a bearing housing, the scroll part and the connection part each being formed by processing a single piece of sheet metal. Also, the scroll part and the connection part are each welded to the annular lid part that is orthogonal to the turbine axial direction, so as to be connected to each other in the turbine axial direction via the annular lid part.

Since a turbine housing is broken down into modules such as the scroll part and the connection part, the scroll part and the connection part each being formed by processing a single piece of sheet metal, it is possible to reduce the heat capacity and weight of the turbine hosing. Also, since the scroll part and the connection part are each formed by processing a single piece of sheet metal, the manufacture of the same is facilitated.

Further, since it is configured such that the turbine housing is broken down into modules such as the scroll part inside which the exhaust gas flow path of a spiral shape is formed and the connection part configured connectable to a bearing housing, the scroll part and the connection part being connected to each other via the annular lid part, it is possible to configure the turbine housing assembly of the present invention as an assembly of a plurality of standardized constituent modules, which makes it possible to facilitate the manufacture. Also, since the scroll part and the connection part are connected to each other by welding, the sealability is enhanced and thus a conventional outer shell is no longer required. As a result, it is possible to reduce the weight and heat capacity of the turbine housing.

Still further, since the turbine housing is broken down into modules such as the scroll part and the connection part, which are connected to each other in the turbine axial direction via the annular lid part that is orthogonal to the turbine axial direction, it is possible to block the influence of the exhaust gas having a high temperature in the scroll part by the annular lid part. Thus, it is possible to form the connection part of a material having lower heat resistance than that of the scroll part. That is, it is possible to form the connection part of a less expensive material containing less nickel than the scroll part. As a result, it is possible to reduce the cost.

Furthermore, in the above invention, with the annular lid part having a separate body separate from the scroll part and the connection part, it is possible to form each constituent member included in the turbine housing assembly of the present invention such as the scroll part, the connection part, and the annular lid part into a simple shape. As a result, it is possible to facilitate the manufacture of each constituent member.

Also at this time, in the above invention, forming the annular lid part by processing a single piece of sheet metal contributes to reducing the weight and heat capacity of the turbine housing as well.

Further, in the above invention, the turbine housing assembly further includes an exhaust part of a tubular shape having a separate body separate from the scroll part, and the exhaust part is connected to the scroll part in the turbine axial direction so as to communicate with the exhaust gas outlet.

As described above, by breaking down a turbine housing into modules such as the scroll part, the connection part, and the exhaust part of a tubular shape, and configuring the exhaust part of a tubular shape to have a separate body separate from the scroll part, it is possible to form each constituent member included in the turbine housing of the present invention into a simple shape, thereby facilitating the manufacture of each constituent member. Further, since the exhaust part is connected to the scroll part in the turbine axial direction, the constituent members included in the turbine housing assembly of the present invention such as the connection part, the annular lid part, the scroll part and the exhaust part are all connected in the turbine axial direction. As a result, assembling property of the turbine housing assembly is improved.

The turbine housing assembly of the present invention with the above configuration includes a variable nozzle mechanism that adjusts flow of the exhaust gas flowing into the turbine wheel, the variable nozzle mechanism being inserted into the scroll part and the connection part. In other words, the turbine housing assembly constitutes a turbine housing of a variable geometry turbocharger.

Further, a manufacturing method of the present invention is for a turbine housing assembly which includes a plurality of constituent members connected to one another to constitute a turbine housing into which a turbine wheel rotated by exhaust gas introduced from an engine is inserted. The manufacturing method includes: a scroll part forming step of forming a scroll part by processing a single piece of sheet metal, the scroll part having: a bottomed cylindrical shape including a surrounding wall part and a bottom face part; an exhaust gas flow path of a spiral shape formed inside the bottomed cylindrical shape, the exhaust gas flow path being configured such that exhaust gas that has flowed in from an exhaust gas inlet flows through the exhaust gas flow path; and an exhaust gas outlet having a through hole formed on the bottom face part, the exhaust gas outlet being configured such that the exhaust gas that has flowed through the exhaust gas flow path flows out from the exhaust gas outlet; and a connection part forming step of forming a connection part by processing a single piece of sheet metal, the connection part being connectable to a bearing housing that houses a bearing for supporting a rotation shaft of the turbine wheel; an annular lid part forming step of forming an annular lid part of a flat plate-like annular shape by processing a single piece of sheet metal; and a welding step of arranging the annular lid part to be orthogonal to a turbine axial direction, welding the scroll part to one side of the annular lid part, and welding the connection part to other side of the annular lid part.

For the manufacturing method for the turbine housing assembly 1 of the present invention configured as above, a turbine housing is broken down into modules such as the scroll part inside which the exhaust gas flow path of a spiral shape is formed and the connection part connectable to a bearing housing, and the scroll part and the connection part are each formed by processing a single piece of sheet metal. Then, the scroll part and the connection part are each welded to the annular lid part that is orthogonal to the turbine axial direction so as to be connected to each other in the turbine axial direction via the annular lid part. As a result, the turbine housing assembly is manufactured.

Since a turbine housing is broken down into modules such as the scroll part and the connection part and then the scroll part and the connection part are each formed by processing a single piece of sheet metal, it is possible to reduce the heat capacity and weight of the turbine housing. Also, since the scroll part and the connection part are each formed by processing a single piece of sheet metal, the manufacture of the same is facilitated.

Furthermore, since the annular lid part has a separate body separate from the scroll part and the connection part, it is possible to form each constituent member included in the turbine housing assembly of the present invention such as the scroll part, the connection part, and the annular lid part into a simple shape. As a result, it is possible to facilitate the manufacture of each constituent member.

Further, in the above invention, the exhaust part of a tubular shape having a separate body separate from the scroll part is prepared. Then, the connection step is included, where the exhaust part and the scroll part are connected to each other in the turbine axial direction so that the exhaust part communicates with the exhaust gas outlet of the scroll part. Thus, all of the constituent members included in the turbine housing assembly of the present invention such as the connection part, the annular lid part, the scroll part and the exhaust part are connected in the turbine axial direction. As a result, assembling property of the turbine housing assembly is improved.

According to the present invention, it is possible to provide a turbine housing assembly in which reduction of weight, facilitation of manufacture, cost-cutting, reduction of heat capacity are even more promoted compared to a conventional turbine housing made of sheet metal, and a manufacturing method of the turbine housing assembly.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
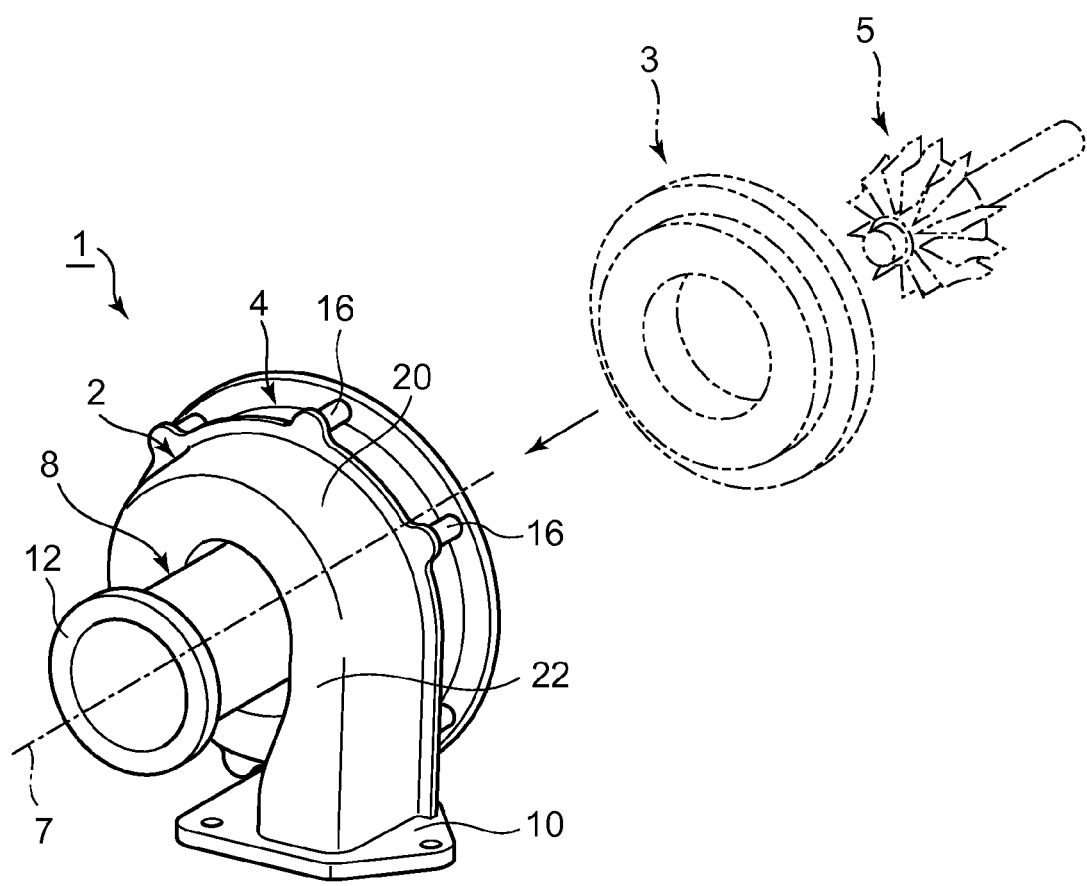
FIG. 1 is a perspective view of a turbine housing assembly of the present invention.
Figure 2:
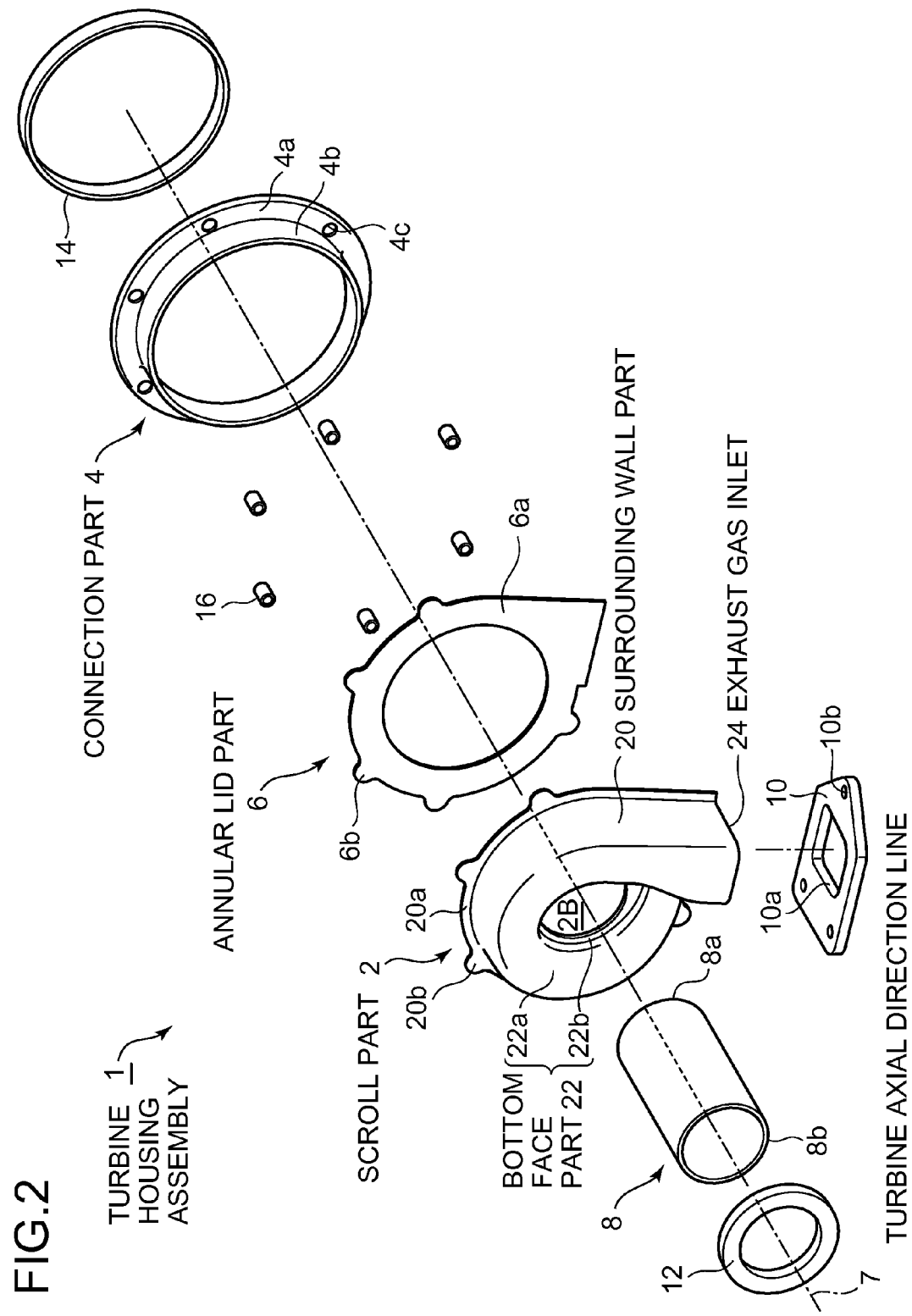
FIG. 2 is an exploded perspective view of the turbine housing assembly of the present invention.
Figure 3:
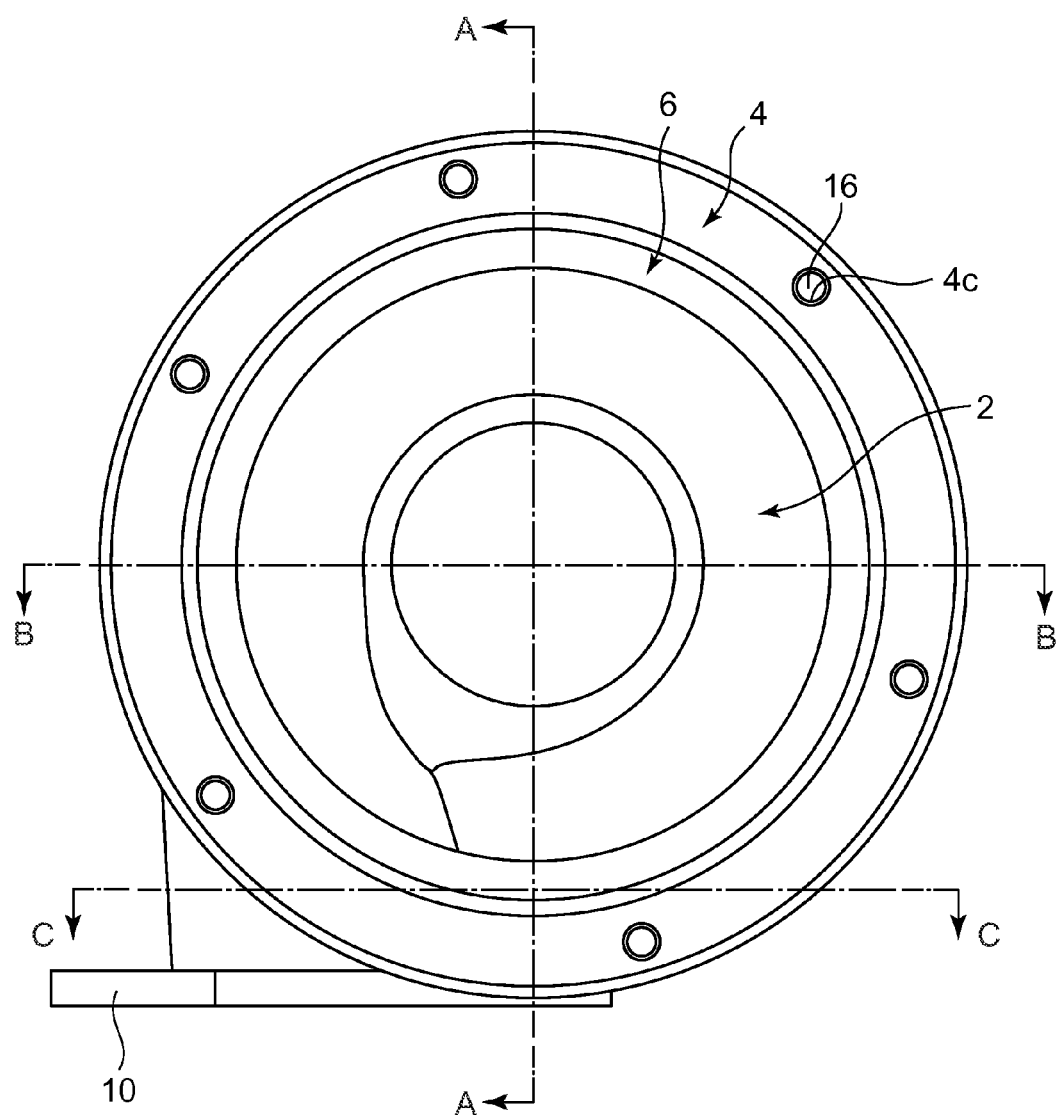
FIG. 3 is a front view of the turbine housing assembly of the present invention.
Figure 4:
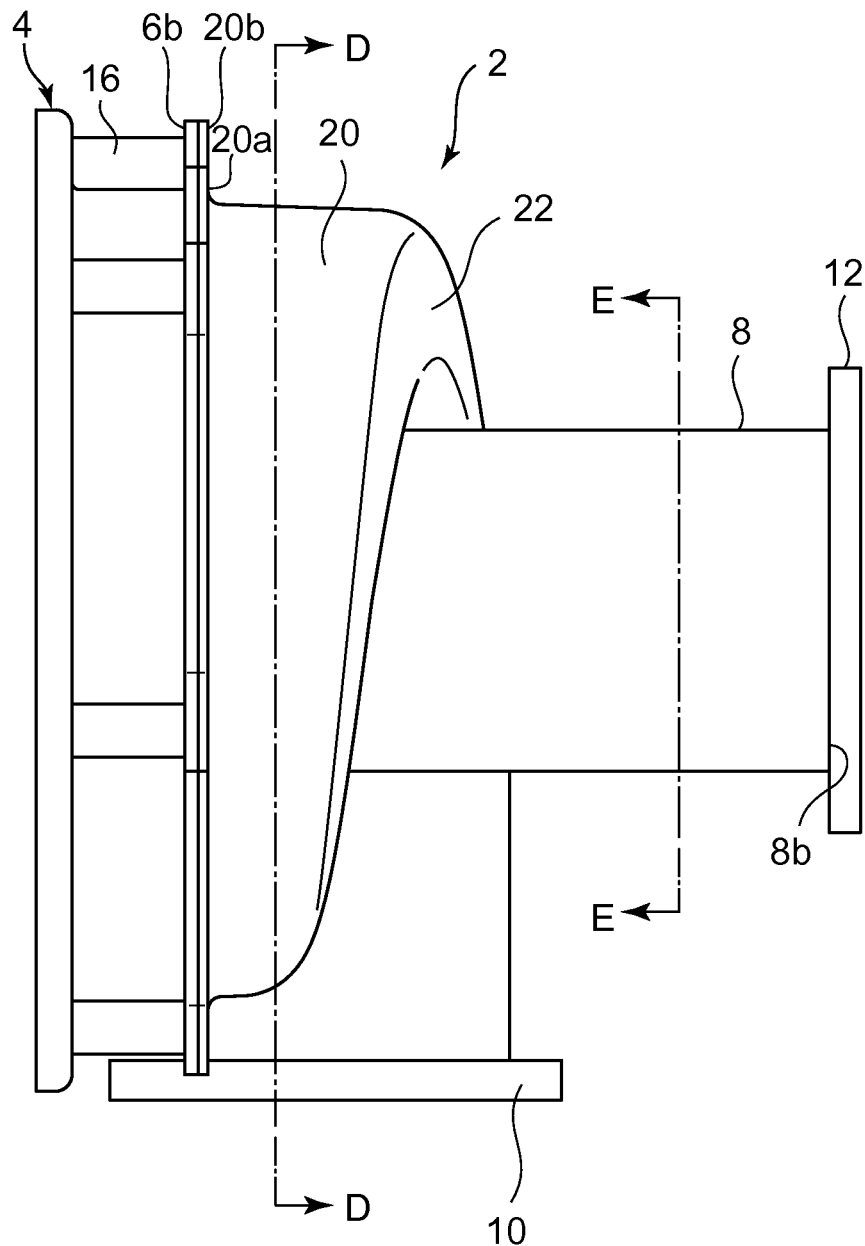
FIG. 4 is a side view of the turbine housing assembly of the present invention.

FIG. 1 is a perspective view of a turbine housing assembly of the present invention. FIG. 2 is an exploded perspective view of the turbine housing assembly of the present invention. Further, FIG. 3 is a front view of the turbine housing assembly of the present invention. FIG. 4 is a side view of the turbine housing assembly of the present invention. FIGS. 5 to 9 are cross-sectional views taken along lines A-A to E-E of FIGS. 3 and 4.

Although not particularly limited to this, a turbine housing assembly 1 of the present invention is a turbine housing of a VG (variable geometry) turbocharger including a variable nozzle mechanism, for instance. The VG turbocharger includes a variable nozzle mechanism in a turbine housing and controls the amount of exhaust gas flow to be introduced by adjusting the opening degree of the nozzles in the variable nozzle mechanism according to the conditions of the engine. Then, the VG turbocharger controls the supply pressure to the optimum pressure by increasing or decreasing the rotation speed of a turbine wheel by the amount of exhaust gas flow.

A turbine housing assembly 1 of the present invention is configured as illustrated in FIG. 1 by assembling a plurality of constituent members such as a scroll part 2, a connection part 4, an annular lid part 6, and an exhaust part 8 as illustrated in FIG. 2. Then, as illustrated in FIG. 1, a variable nozzle mechanism 3 and a turbine wheel 5 are inserted into the assembled turbine housing assembly 1 from the front side thereof. Further, a bearing housing (not illustrated) for housing a bearing that rotatably supports a rotation shaft of the turbine wheel 5 is connected to the front side of the assembled turbine housing assembly 1.

Figure 6:
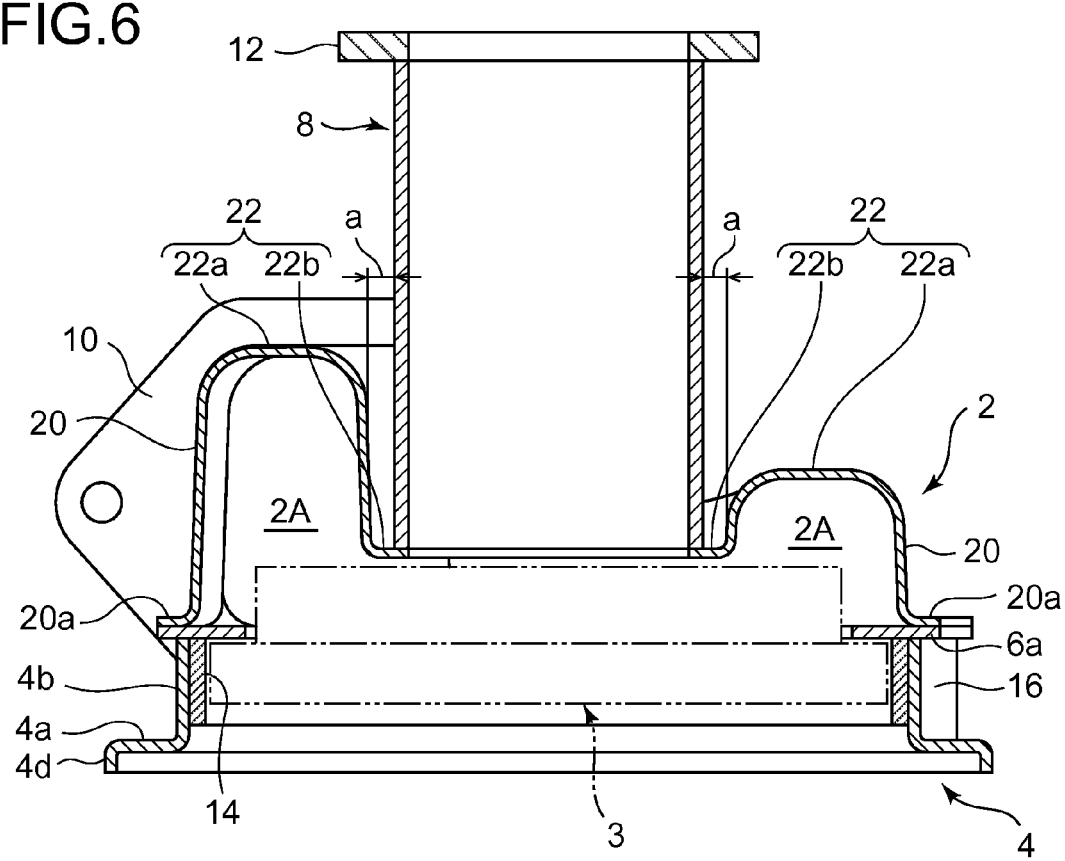
FIG. 6 is a cross-sectional view taken along line B-B of FIG. 3.
Figure 7:
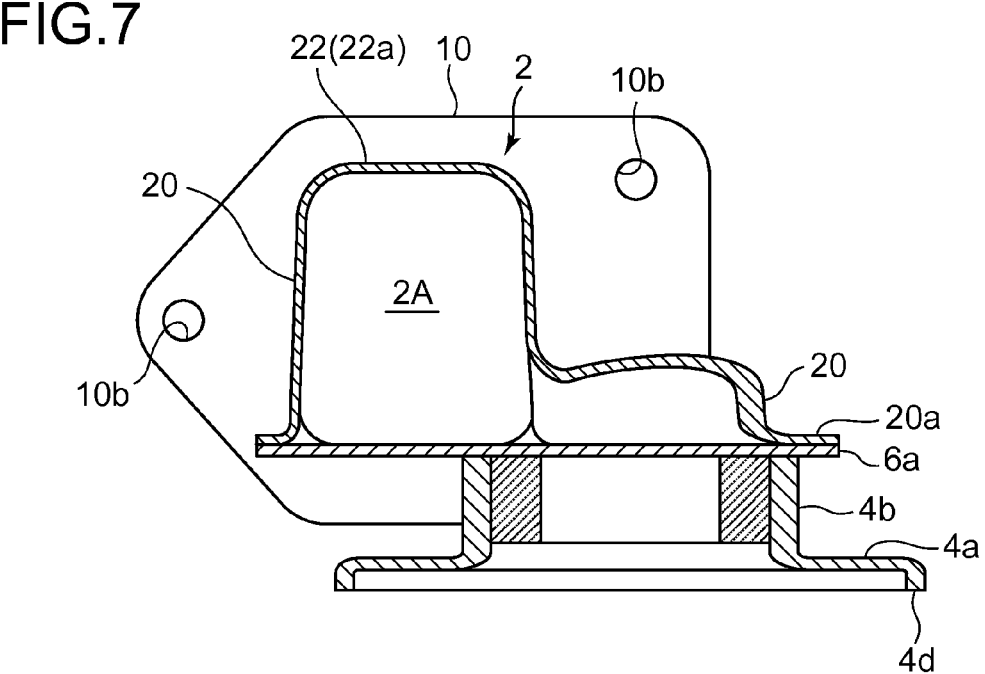
FIG. 7 is a cross-sectional view taken along line C-C of FIG. 3.

As illustrated in FIGS. 1, 2, 6 and so on, the scroll part 2 has a bottomed cylindrical shape including a surrounding wall part 20 and a bottom face part 22. Further, as illustrated in FIG. 8, an exhaust gas flow path 2A is formed into a spiral shape along the surrounding wall part 20 inside the scroll part 2 of a bottomed cylindrical shape, while an exhaust gas outlet 2B is disposed on the bottom face part 22, the exhaust gas outlet 2B having a through hole thereon at a position surrounded by the exhaust gas flow path 2A formed into a spiral shape.

Figure 5:
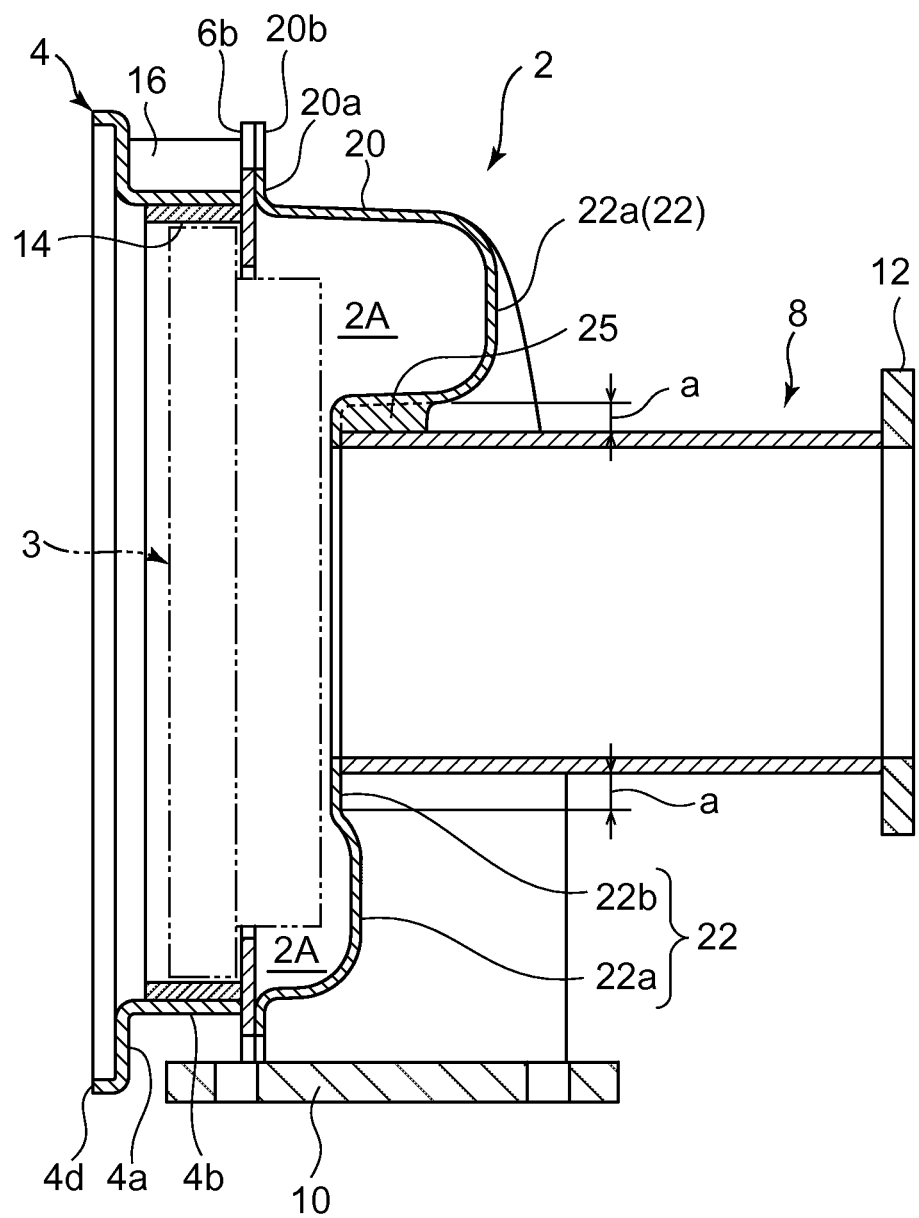
FIG. 5 is a cross-sectional view taken along line A-A of FIG. 3.

As illustrated in FIGS. 5 and 6, the bottom face of the exhaust gas flow path 2A of a spiral shape has a shape projecting toward the back face side of the bottom face part 22. Further, a cross-section of the flow path is formed so as to become shallow monotonically in a predetermined turning direction. Accordingly, the back face side of the bottom face part 22 is formed to have an uneven surface, including a recess portion 22b through which the exhaust gas outlet 2B is formed and a projecting portion 22a formed into a projecting shape that surrounds the recess portion 22b.

Further, as illustrated in FIGS. 2, and 4 to 7, a flange portion 20a is formed on an edge of the surrounding wall part 20, the flange portion 20a protruding outward in a direction substantially perpendicular with respect to the surrounding wall part 20. Also, a plurality of positioning portions 20b are formed on the flange portion 20a with equal intervals in the circumferential direction, the positioning portions 20b protruding outward from the flange portion 20a.

Figure 8:
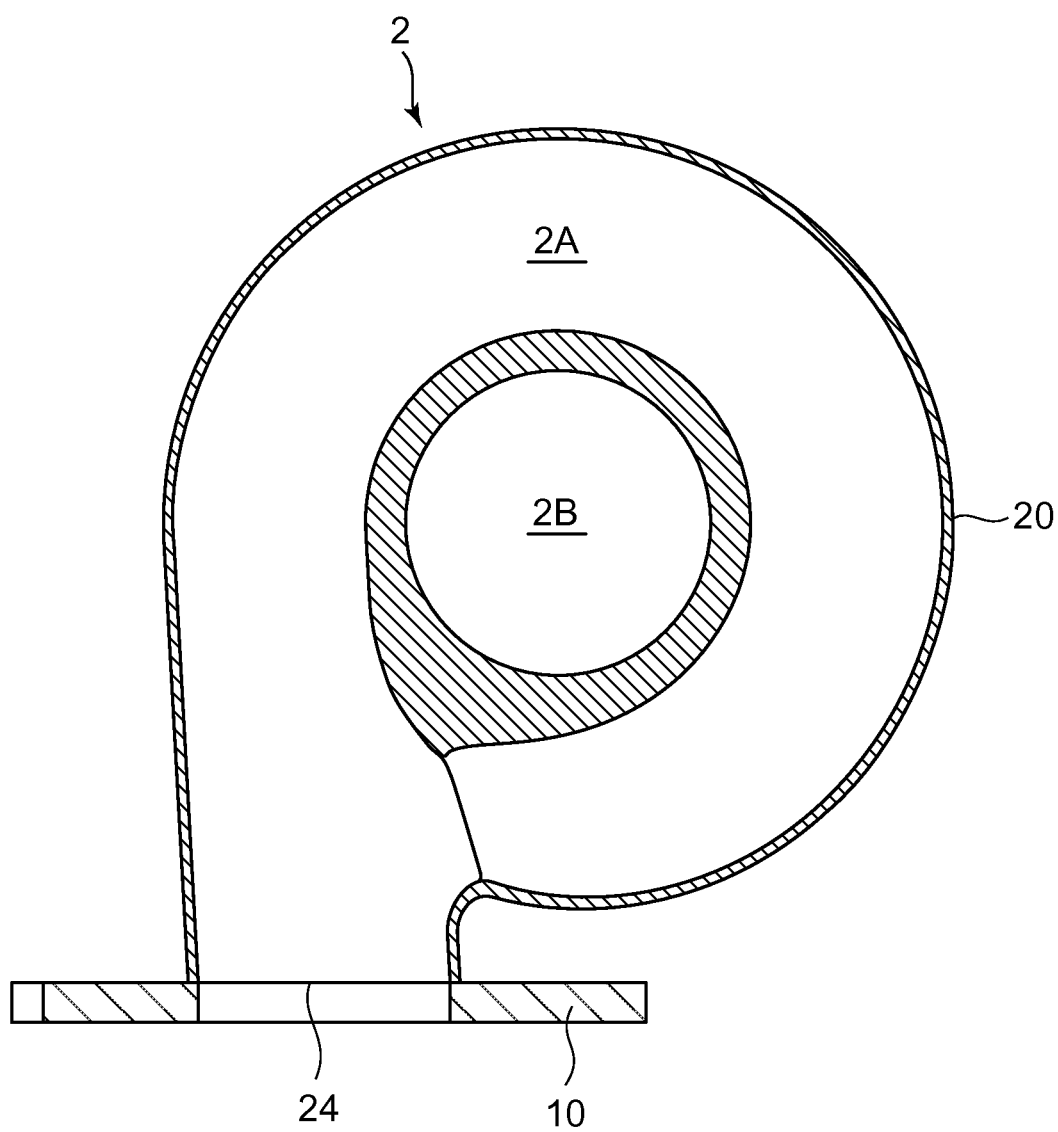
FIG. 8 is a cross-sectional view taken along line D-D of FIG. 4.

Still further, as illustrated in FIGS. 2, 8 and so on, an exhaust gas inlet 24 is formed on the upstream end of the exhaust gas flow path 2A. To the exhaust gas inlet 24, an engine-side flange portion 10 of a flat plate-like shape is connected by, for instance, welding. The engine-side flange portion 10 has bolt insertion holes 10b formed thereon so as to be fastened to an exhaust duct (not illustrated) by bolts. Accordingly, exhaust gas having a high temperature discharged from the engine flows through the exhaust duct to be introduced into the exhaust gas flow path 2A, passing through the exhaust gas inlet 24 from an opening 10a of the engine-side flange portion 10. The introduced exhaust gas is, after rotating the above described turbine wheel 5, discharged from the exhaust gas outlet 2B.

As illustrated in FIGS. 2, 5, 6 and so on, the connection part 4 includes a flange portion 4a of an annular and flat plate-like shape and a protruding portion 4b of an annular shape protruding perpendicularly with respect to the flange portion 4a. The flange portion 4a has a plurality of bushing insertion holes 4c formed thereon with equal intervals in the circumferential direction of the flange portion 4a. It is configured such that a threaded bushing 16 that has a cylindrical shape and threads formed on its hole is inserted into each of the bushing insertion holes 4c. The threaded bushings 16 are used as bolt holes for fastening the above described bearing housing and the connection part 4 by bolts.

As illustrated in FIG. 2, the annular lid part 6 includes a flat plate-like part 6a of an annular shape and positioning portions 6b protruding outward from the flat plate-like part 6a. The positioning portions 6b are disposed on the positions corresponding to the positioning portions 20b of the scroll part 2 and the bushing insertion holes 4c of the connection part 4 described above with the same intervals as the above.

The scroll part 2, the connection part 4, and the annular lid part 6 are each formed by processing a single piece of sheet metal. That is, each of the above is formed by plastic-deforming a flat plate-like piece of sheet metal into a predetermined shape by processes such as bending and pressing, or by partially cutting-off unnecessary portions by processes such as punching. Further, as a material of the scroll part 2, connection part 4, and annular lid part 6, for instance, a heat-resistant steel such as austenite stainless steel may be suitably used.

As illustrated in FIG. 2, the exhaust part 8 is formed into a tubular shape. Further, an end portion 8a of the exhaust part 8 is connected to the recess portion 22b at the back face side of the bottom face part 22 of the scroll part 2 described above by welding for instance, to be in communication with the exhaust gas outlet 2B. Meanwhile, to the other end portion 8b of the exhaust part 8, a muffler-side flange portion 12 including an annular and flat plate-like member is connected by, for instance, welding. With the muffler-side flange portion 12 being connected to a muffler-side exhaust duct (not illustrated), exhaust gas that has flowed through the exhaust part 8 passes through the muffler-side exhaust duct to be discharged outside of the vehicle from a muffler.

Still further, as illustrated in FIGS. 5 and 6, a gap "a" is formed between the projecting portion 22a and the outer circumferential face of the exhaust part 8 connected to the recess portion 22b of the scroll part 2. With the exhaust part 8 being connected to the scroll part 2 so that the gap "a" is formed between the projecting portion 22a of the scroll part 2 and the outer circumferential face of the exhaust part 8, it becomes difficult for the exhaust gas having a high temperature and flowing through the exhaust gas flow path 2A to affect the exhaust part 8. Here, in the present invention, the gap "a" between the outer circumferential face of the exhaust part 8 and the projecting portion 22a means a distance which separates the outer circumferential face of the exhaust part 8 and the projecting portion 22a in a direction perpendicular to the outer surface of the exhaust part 8.

In other words, as exhaust gas that has passed through the turbine wheel 5 expands so that its temperature decreases in the first place, the temperature of the exhaust gas flowing into the exhaust part 8 is lower than that of the exhaust gas flowing through the exhaust gas flow path 2A by approximately 100 degrees. Accordingly, with the exhaust part 8 and the scroll part 2 being connected so that the gap "a" is formed between the outer circumferential face of the exhaust part 8 and the projecting portion 22a, it becomes difficult for the exhaust gas having a high temperature and flowing through the exhaust gas flow path 2A to affect the exhaust part 8. Thus, it is possible to select a material of the exhaust part 8 in accordance with the temperature of the exhaust gas that passes through the exhaust part 8. As a result, it is possible to form the exhaust part 8 of a material having less heat resistance than that of the scroll part 2 (specifically, a stainless material that contains less nickel and is less expensive).

Figure 9:
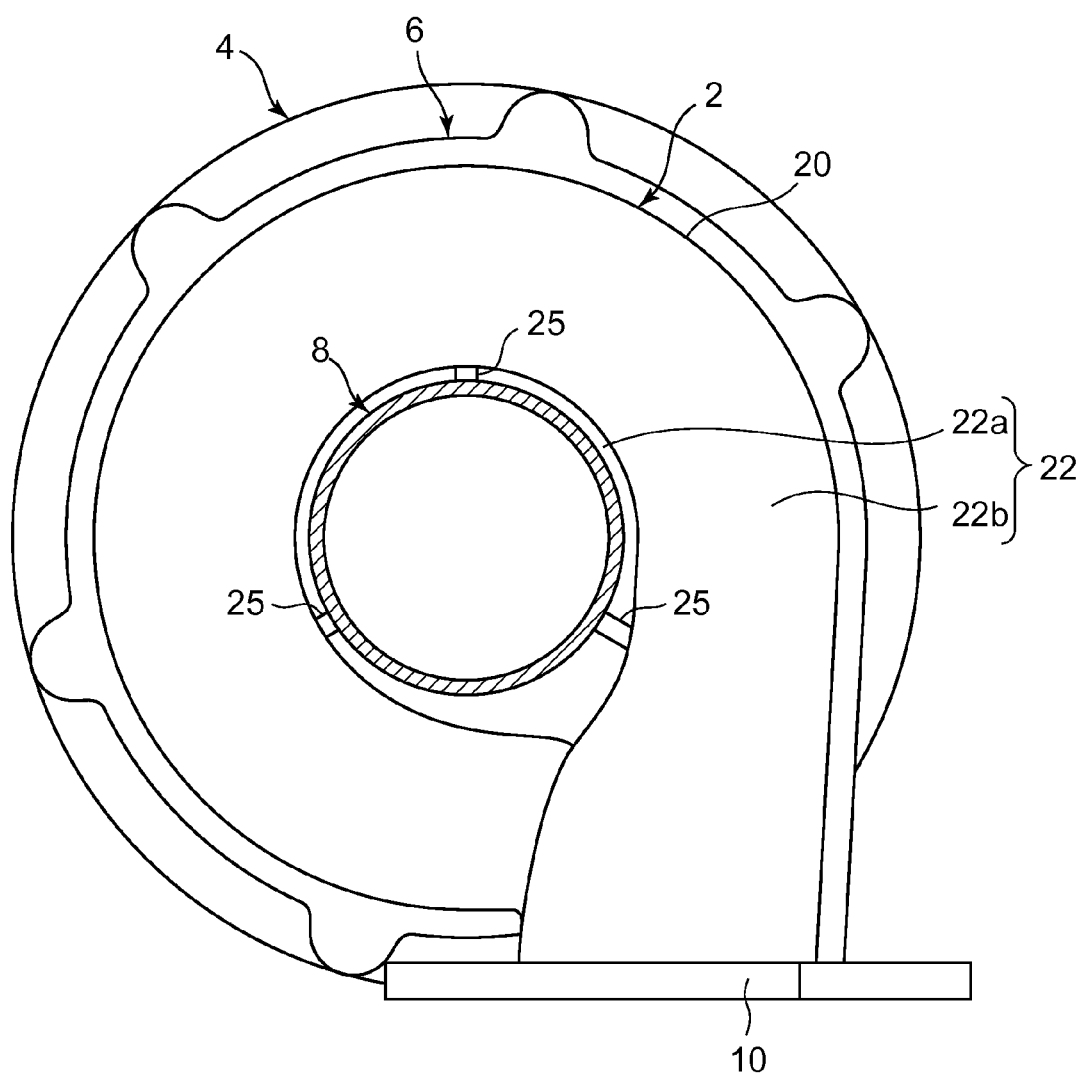
FIG. 9 is a cross-sectional view taken along line E-E of FIG. 4.

Further, as illustrated in FIG. 5, reinforcement ribs 25 are disposed on the inner circumferential side of the projecting portion 22a of the scroll part 2. The reinforcement ribs 25 are connected to the outer circumferential face of the exhaust part 8 by, for instance, welding. Also, as illustrated in FIG. 9, a plurality of (for instance, three) reinforcement ribs 25 are disposed with equal intervals in the circumferential direction. By providing such reinforcement ribs 25, the scroll part 2 and the exhaust part 8 are connected to each other even more securely.

Here, as illustrated in FIG. 5, the reinforcement ribs 25 of the present embodiment are provided integrally with the projecting portion 22a of the scroll part 2. However, the present invention is not limited to this. For instance, although not illustrated, the reinforcement ribs 25 may be provided integrally with the exhaust part 8 and connected to the inner circumferential side of the projecting portion 22a. Also for instance, the reinforcement ribs 25 may be provided separately from the scroll part 2 and the exhaust part 8, and connected to the inner circumferential side of the projecting portion 22a and the outer circumferential face of the exhaust part 8.

As described above, for the turbine housing assembly 1 of the present invention, a turbine housing is broken down into modules such as the scroll part 2 inside which the exhaust gas flow path 2A of a spiral shape is formed and the connection part 4 connectable to a bearing housing, and the scroll part 2 and the connection part 4 are each formed by processing a single piece of sheet metal. Further, the scroll part 2 and the connection part 4 are each welded to the annular lid part 6 that is orthogonal to the turbine axial direction line 7 so as to be connected to each other in the turbine axial direction via the annular lid part 6.

According to the turbine housing assembly 1 of the present invention configured as described above, since a turbine housing is broken down into modules such as the scroll part 2 and the connection part 4, each of which being formed by processing a single piece of sheet metal, it is possible to reduce the heat capacity and weight of the turbine housing. Further, since they are each formed by processing a single piece of sheet metal, the manufacture of the scroll part 2 and the connection part 4 is facilitated.

Further, as described above, since a turbine housing is broken down into modules such as the scroll part 2 inside which an exhaust gas flow path 2A of a spiral shape is formed and the connection part 4 connectable to a bearing housing, the scroll part 2 and the connection part 4 being connected to each other via the annular lid part 6, it is possible to configure the turbine housing assembly 1 of the present invention as an assembly of a plurality of standardized constituent modules. Thus, it is possible to facilitate the manufacture. Moreover, since the scroll part 2 and the connection part 4 are connected to each other by welding, the sealability is enhanced and thus the conventional outer shell is no longer required. As a result, it is possible to reduce the weight and heat capacity of the turbine housing.

Still further, as described above, since the turbine housing is broken down into modules such as the scroll part 2 and the connection part 4, which are connected to each other in the turbine axial direction via the annular lid part 6 that is orthogonal to the turbine axial direction line 7, it is possible to block the influence of the exhaust gas having a high temperature in the scroll part 2 by the annular lid part 6. Thus, it is possible to form the connection part 4 of a stainless material having lower heat resistance than that of the scroll part 2. That is, it is possible to form the connection part 4 of a less expensive stainless material containing less nickel than the scroll part 2. As a result, it is possible to reduce the cost of the turbine housing compared to the case where a whole turbine housing is formed of a single material.

Also, as described above, with the annular lid part 6 having a separate body separate from the scroll part 2 and the connection part 4, it is possible to form each constituent member such as the scroll part 2, the connection part 4, and the annular lid part 6 into a simple shape. As a result, it is possible to facilitate the manufacture of each constituent member. Further, at this time, forming the annular lid part 6 by processing a single piece of sheet metal also contributes to reducing the weight and heat capacity of a turbine housing.

Still further, as described above, the turbine housing assembly 1 of the present invention further includes the exhaust part 8 of a tubular shape having a separate body separate from the scroll part 2, and the exhaust part 8 is connected to the scroll part 2 in the turbine axial direction so that the exhaust part 8 is in communication with the exhaust gas outlet 2B. By breaking down a turbine housing into modules such as the scroll part 2, the connection part 4, and the exhaust part 8 of a tubular shape, the exhaust part 8 of a tubular shape being configured to have a separate body separate from the scroll part 2, it is possible to form each constituent member included in the turbine housing assembly 1 of the present invention into a simple shape. As a result, manufacture of each constituent member is facilitated. Further, since the exhaust part 8 is connected to the scroll part 2 in the turbine axial direction, the constituent members such as the connection part 4, the annular lid part 6, the scroll part 2 and the exhaust part 8 are all connected in the turbine axial direction. As a result, assembling property of the turbine housing assembly 1 is enhanced.

Still further, as described above, since the turbine housing is broken down into modules such as the scroll part 2 and the exhaust part 8, the exhaust part 8 being brought into communication with the exhaust gas outlet 2B of the scroll part 2 in a state where the gap "a" is formed between the outer circumferential face of the exhaust part 8 and the projecting portion 22a of the scroll part 2, it becomes difficult for the exhaust gas having a high temperature and flowing through the exhaust gas flow path 2A of the scroll part 2 to affect the exhaust part 8. Thus, it is possible to form the exhaust part 8 of a material having lower heat resistance than that of the scroll part 2. Specifically, it is possible to form the exhaust part 8 of a less expensive stainless material containing less nickel than the scroll part 2. As a result, it is possible to reduce the cost.

The turbine housing assembly 1 of the present invention including a plurality of constituent members such as the scroll part 2, the connection part 4, the annular lid part 6 and the exhaust part 8 is manufactured as described below.

First, the scroll part 2, the connection part 4, and the annular lid part 6 are each formed by processing a single piece of sheet metal (scroll part forming step, connection part forming step, and annular lid part forming step), and then the exhaust part 8, the engine-side flange portion 10, the muffler-side flange portion 12, etc are prepared.

Next, as illustrated in FIG. 2, the annular lid part 6 is oriented so as to be orthogonal to the turbine axial direction line 7. Then the scroll part 2 is welded to one side, and the connection part 4 is welded to the other side of the annular lid part 6 (welding step). For the scroll part 2, the flange portion 20a at the front side thereof is welded to the flat plate-like part 6a of the annular lid part 6. For the connection part 4, the edge of the protruding portion 4b is welded to the flat plate-like part 6a of the annular lid part 6. At this time, by causing the positioning portions 20b of the scroll part 2 to overlap with the positioning portions 6b of the annular lid part 6, it is possible to easily determine the relative position between the scroll part 2 and the annular lid part 6. Also at this time, to the positioning portions 6b on the other side of the annular lid part 6, end faces of the threaded bushings 16 are connected by welding, for instance. Thus, by bringing the annular lid part 6 and the connection part 4 into contact with each other so that the threaded bushings 16 are inserted through the bushing insertion holes 4c of the connection part 4, it is possible to easily determine the relative position between the annular lid part 6 and the connection part 4.

Further, as illustrated in FIG. 2, the scroll part 2 is oriented so as to be orthogonal to the turbine axial direction line 7 and the exhaust part 8 is oriented so that its longitudinal direction comes along with the turbine axial direction line 7. Then one end portion 8a of the exhaust part 8 and the recess portion 22b of the scroll part 2 are welded to each other for instance, thereby connecting the exhaust part 8 and the scroll part 2 in the turbine axial direction (connecting step).

Still further, as illustrated in FIG. 2, to the exhaust gas inlet 24 of the scroll part 2, the engine-side flange portion 10 is connected by welding, for instance. Moreover, to the other end portion 8b of the exhaust part 8, the muffler-side flange portion 12 is connected by welding, for instance. Here, the engine-side flange portion 10 and the muffler-side flange portion 12 may be connected to the scroll part 2 and the exhaust part 8 in advance.

Finally, as illustrated in FIG. 2, a ring member 14 of an annular shape is inserted to be fitted into the connection part 4 from the front side thereof. As illustrated in FIGS. 5, 6 and so on, the ring member 14 is inserted to a position where it contacts the annular lid part 6. Then, the variable nozzle mechanism 3 is inserted into the inner circumferential side of the ring member 14. With the above described ring member 14 being inserted and fitted into the connection part 4, it is possible to easily determine the position of the variable nozzle mechanism 3.

Here, the technique for: connecting the end portion 8a of the exhaust part 8 to the scroll part 2; connecting the positioning portions 6b on the other side of the annular lid part 6 to the end faces of the threaded bushings 16; connecting the exhaust gas inlet 24 of the scroll part 2 to the engine-side flange portion 10; and connecting the other end portion 8b of the exhaust part 8 to the muffler-side flange portion 12, is not limited to welding. For example, the connection may be performed by fastening bolts, brazing, or the like.

According to the manufacturing method of the turbine housing assembly with the above configuration, since a turbine housing is broken down into modules such as the scroll part 2 inside which the exhaust gas flow path 2A of a spiral shape is formed and the connection part 4 connectable to a bearing housing, the scroll part 2 and the connection part 4 being connected to each other via the annular lid part 6, it is possible to manufacture the turbine housing assembly 1 only by connecting the scroll part 2 and the connection part 4 that have been separately manufactured. Thus, the manufacture is facilitated.

Further, since the annular lid part 6 has a separate body separate from the scroll part 2 and the connection part 4, it is possible to form each constituent member such as the scroll part 2, the connection part 4, and the annular lid part 6 into a simple shape. As a result, the manufacture of each constituent member is facilitated.

Still further, as described above, the exhaust part 8 of a tubular shape having a separate body separate from the scroll part 2 is prepared and connected to the scroll part 2 in the turbine axial direction so that the exhaust part 8 communicates with the exhaust gas outlet 2B of the scroll part 2 (connection step). Thus, the constituent members such as the connection part 4, the annular lid part 6, the scroll part 2, and the exhaust part 8 are all connected in the turbine axial direction. As a result, assembling property of the turbine housing assembly 1 is improved.

According to the present invention, it is possible to provide a turbine housing assembly in which reduction of weight, cost-cutting, facilitation of manufacture, reduction of heat capacity are even more promoted compared to a conventional turbine housing made of sheet metal, and a manufacturing method of the turbine housing assembly.

Embodiments of the present invention were described in detail above, but the present invention is not limited thereto, and various amendments and modifications may be implemented within a scope that does not depart from the present invention.

Figure 10:
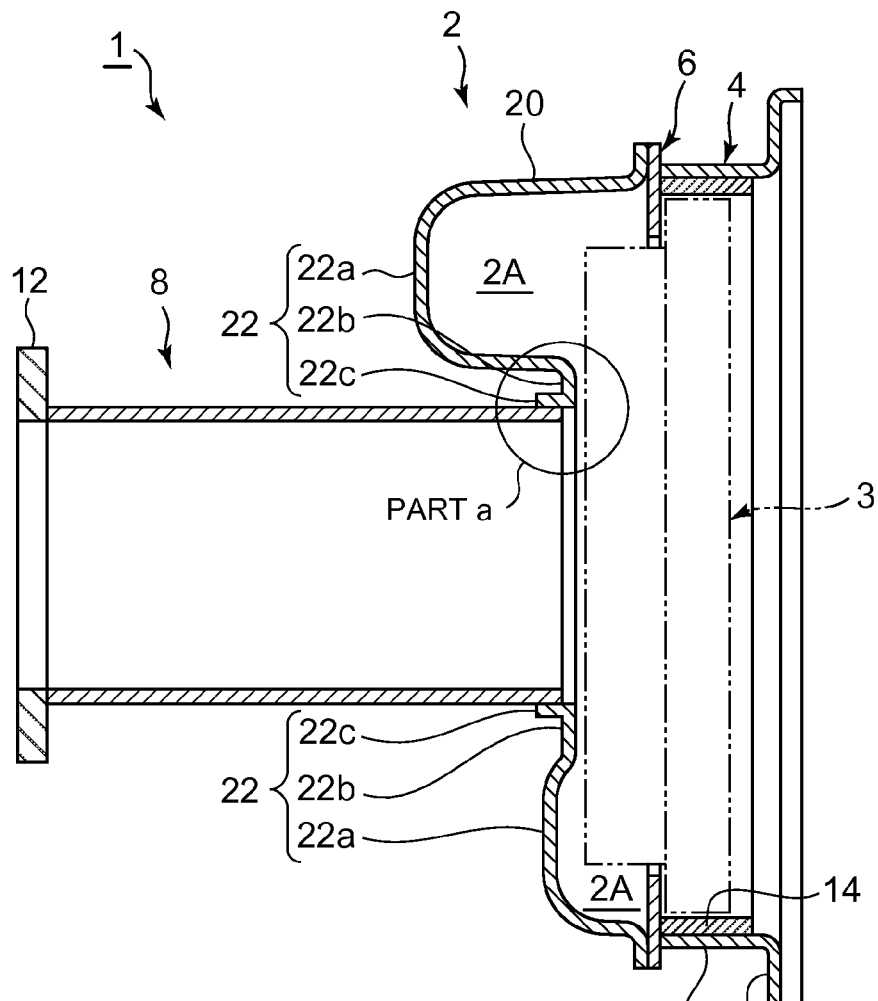
FIG. 10 is a cross-sectional view of a turbine housing assembly of another embodiment of the present invention.
Figure 11:
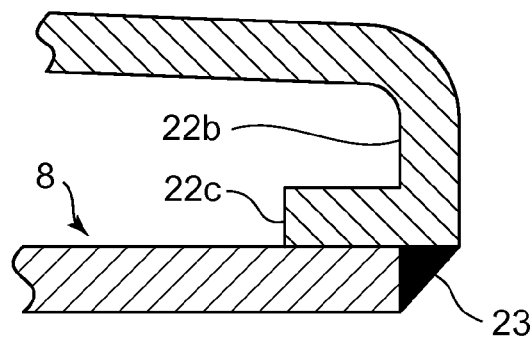
FIG. 11 is an enlarged view of part "a" of FIG. 10.

For instance, FIG. 10 is a cross-sectional view of a turbine housing assembly of another embodiment of the present invention. As illustrated in the drawing, the scroll part 2 of the present invention may include a fit-in portion 22c formed on the bottom face part 22, the fit-in portion 22c being formed by bending the bottom face part 22 around the exhaust gas outlet 2B toward the back face side so that the end portion 8a of the exhaust part 8 can be inserted and fitted therein. With such a fit-in portion 22c, it is possible to insert and fit the end portion 8a of the exhaust part 8 into the fit-in portion 22c to connect the end portion 8a to the inner circumferential side of the fit-in portion 22c by a fillet weld 23 as illustrated in FIG. 11, for instance. As a result, by inserting and fitting the end portion 8a of the exhaust part 8 into the fit-in portion 22c, it is possible to perform determination of the position and temporary joint upon welding at the same time for the exhaust part 8, which leads to high workability in welding.

INDUSTRIAL APPLICABILITY

The present invention can be suitably used as a turbine housing assembly for a turbocharger, preferably a turbine housing assembly for a VG turbocharger for a vehicle, and as a manufacturing method of the turbine housing assembly.

The invention claimed is:

1. A turbine housing assembly including a plurality of constituent members connected to one another to constitute a turbine housing into which a turbine wheel rotated by exhaust gas introduced from an engine is inserted, the turbine housing assembly at least comprising:
   a scroll part made of sheet metal having a bottomed cylindrical shape, a surrounding wall part and a bottom face part, the scroll part including:
      an exhaust gas flow path of a spiral shape formed inside the bottomed cylindrical shape and configured such that exhaust gas that has flowed in from an exhaust gas inlet flows through the exhaust gas flow path; and
      an exhaust gas outlet having a through hole formed on the bottom face part, the exhaust gas outlet being configured such that the exhaust gas that has flowed through the exhaust gas flow path flows out from the exhaust gas outlet;
   a connection part made of sheet metal and connectable to a bearing housing that houses a bearing for supporting a rotation shaft of the turbine wheel, said connection part comprising bushing holes,
   an annular lid part orthogonal to a turbine axial direction, the scroll part being welded to one surface of the annular lid part and the connection part being welded to the other surface of the annular lid part, wherein
   the annular lid part includes a flat plate-like part of an annular shape and a positioning portion protruding outwardly from the flat plate-like part, and
   an end face of a threaded bushing is inserted into a bushing insertion hole formed on the connection part and connected to the positioning portion of the annular lid part.

2. The turbine housing assembly according to claim 1, wherein the connection part is made of a material that has lower heat resistance strength than the scroll part.

3. The turbine housing assembly according to claim 2, wherein the connection part is made of a material that contains less nickel than the scroll part.

4. The turbine housing assembly according to claim 1, wherein the annular lid part comprises a separate body separate from the scroll part and the connection part.

5. The turbine housing assembly according to claim 4, wherein the annular lid part is formed of a single piece of sheet metal.

6. The turbine housing assembly according to claim 4, further comprising an exhaust part of a tubular shape comprising a separate body separate from the scroll part, wherein the exhaust part is connected to the scroll part in the turbine axial direction so that the exhaust part is in communication with the exhaust gas outlet.

7. The turbine housing assembly according to claim 1, further comprising a variable nozzle mechanism configured to adjust flow of the exhaust gas flowing toward the turbine wheel, the variable nozzle mechanism being inserted into the scroll part and the connection part.

8. A manufacturing method for a turbine housing assembly including a plurality of constituent members connected to one another to constitute a turbine housing into which a turbine wheel rotated by exhaust gas introduced from an engine is inserted, the manufacturing method comprising:
   forming a scroll part of a single piece of sheet metal, the scroll part having:
      a bottomed cylindrical shape including a surrounding wall part and a bottom face part;
      an exhaust gas flow path of a spiral shape formed inside the bottomed cylindrical shape, the exhaust gas flow path being configured such that exhaust gas that has flowed in from an exhaust gas inlet flows through the exhaust gas flow path; and
      an exhaust gas outlet having a through hole formed on the bottom face part, the exhaust gas outlet being configured such that the exhaust gas that has flowed through the exhaust gas flow path flows out from the exhaust gas outlet;
   forming a connection part of a single piece of sheet metal, the connection part being connectable to a bearing housing that houses a bearing for supporting a rotation shaft of the turbine wheel, said connection part comprising bushing insertion holes;
   forming an annular lid part of a flat plate-like annular shape of a single piece of sheet metal, the annular lid part including a flat plate-like part of an annular shape and a positioning portion protruding outwardly from the flat plate-like part; and
   arranging the annular lid part to be orthogonal to a turbine axial direction, welding the scroll part to one side of the annular lid part, and welding the connection part to other side of the annular lid part, wherein
   said method further comprising inserting an end face of a threaded bushing into a bushing insertion hole formed on the connection part and connecting the connecting part to the positioning portion of the annular lid part.

9. The manufacturing method for a turbine housing assembly according to claim 8, further comprising
   preparing an exhaust part of a tubular shape comprising a separate body separate from the scroll part, and connecting the exhaust part to the scroll part in the turbine axial direction so that the exhaust part is in communication with the exhaust gas outlet of the scroll part.

* * * * *